United States Patent
Quinn et al.

(10) Patent No.: US 9,742,891 B2
(45) Date of Patent: Aug. 22, 2017

(54) PERSONAL COMPUTER AND MOBILE PHONE COMMUNICATIONS THROUGH PEER-TO-PEER CONNECTION

(75) Inventors: Liam B. Quinn, Austin, TX (US);
Carlton A. Andrews, Austin, TX (US);
Mark L. Rehmann, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 323 days.

(21) Appl. No.: 13/010,916

(22) Filed: Jan. 21, 2011

(65) Prior Publication Data

US 2012/0188999 A1    Jul. 26, 2012

(51) Int. Cl.
*H04W 76/02* (2009.01)
*H04M 1/60* (2006.01)
*H04M 7/00* (2006.01)
*H04W 88/06* (2009.01)

(52) U.S. Cl.
CPC ....... *H04M 1/6066* (2013.01); *H04M 7/0012* (2013.01); *H04W 76/02* (2013.01); *H04W 88/06* (2013.01)

(58) Field of Classification Search
CPC .................................................. H04M 3/5183
USPC ................ 370/352; 455/452, 575.2; 709/228
See application file for complete search history.

(56) References Cited

U.S. PATENT DOCUMENTS

| | | | |
|---|---|---|---|
| 7,676,229 B2 | 3/2010 | Albina et al. | |
| 8,250,224 B2 * | 8/2012 | Lai | 709/228 |
| 8,478,306 B2 * | 7/2013 | Zheng | 455/456.6 |
| 8,576,835 B2 * | 11/2013 | Acharya | H04M 3/5191 370/352 |
| 2003/0232597 A1 * | 12/2003 | Mayer | 455/15 |
| 2005/0215243 A1 * | 9/2005 | Black et al. | 455/417 |
| 2005/0286466 A1 | 12/2005 | Tagg et al. | |
| 2006/0209792 A1 | 9/2006 | Nurnberger | |
| 2006/0276230 A1 * | 12/2006 | McConnell | 455/563 |
| 2007/0082668 A1 * | 4/2007 | Silver et al. | 455/432.3 |
| 2007/0167167 A1 * | 7/2007 | Jiang | 455/453 |
| 2007/0280200 A1 | 12/2007 | Patel | |
| 2008/0032752 A1 * | 2/2008 | Tamura | H04M 1/6066 455/569.1 |
| 2008/0045176 A1 * | 2/2008 | Ho et al. | 455/344 |
| 2008/0104681 A1 * | 5/2008 | Lai | 726/5 |

(Continued)

OTHER PUBLICATIONS

Plantronics Preview: 2011 UC Portfolio, Product Sheet; Savi 730 Wireless Headset; Voyager PRO UC Wireless Headset; Plantronics, Inc., Nov. 20, 2010; http://www.plantronics.com/media/uc/uc_portfolio_preview.pdf.

(Continued)

*Primary Examiner* — Edan Orgad
*Assistant Examiner* — Emmanuel Maglo
(74) *Attorney, Agent, or Firm* — Larson Newman, LLP

(57) ABSTRACT

An information handling system includes a network interface, a radio frequency interface, and a processor. The processor is configured to receive a call initiation signal from a remote system through the network interface, establish a connection with a portable communication device through the radio frequency interface, and accept a call from the remote system. Additionally, the processor is further configured to route audio signals related to the call between the portable communication device and the remote system.

18 Claims, 5 Drawing Sheets

(56) References Cited

U.S. PATENT DOCUMENTS

| | | | |
|---|---|---|---|
| 2008/0233978 A1* | 9/2008 | Batey et al. | 455/462 |
| 2009/0023450 A1* | 1/2009 | George | H04L 12/66 |
| | | | 455/442 |
| 2009/0210521 A1* | 8/2009 | Augeray | 709/221 |
| 2010/0081488 A1* | 4/2010 | Kim | 455/575.2 |
| 2010/0098230 A1* | 4/2010 | Bhow | 379/202.01 |
| 2010/0197288 A1 | 8/2010 | Camilleri et al. | |
| 2011/0035504 A1* | 2/2011 | Lai | 709/228 |

OTHER PUBLICATIONS

OfficeRunner Wireless Headset System from Sennheiser, Product Specifications; Jan. 20, 2011 http://www.headsets.com/headset/officerunner-wireless-headset-system-from-sennheiser-basic-bundle/.

"Hands-on: The Jawbone Icon headset has style, a voice and an apps store," Krasnoff, B.; Jabone ICON Product Review; Jan. 21, 2010; http://www.computerworld.com/s/article/9146678/Hands_on_The_Jawbone_Icon_headset_has_style_a_voice_and_an_apps_store.

* cited by examiner

PERSONAL COMPUTER AND MOBILE PHONE COMMUNICATIONS THROUGH PEER-TO-PEER CONNECTION

FIELD OF THE DISCLOSURE

This disclosure generally relates to information handling systems, and more particularly relates to personal computer and mobile phone communications through a peer-to-peer connection.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
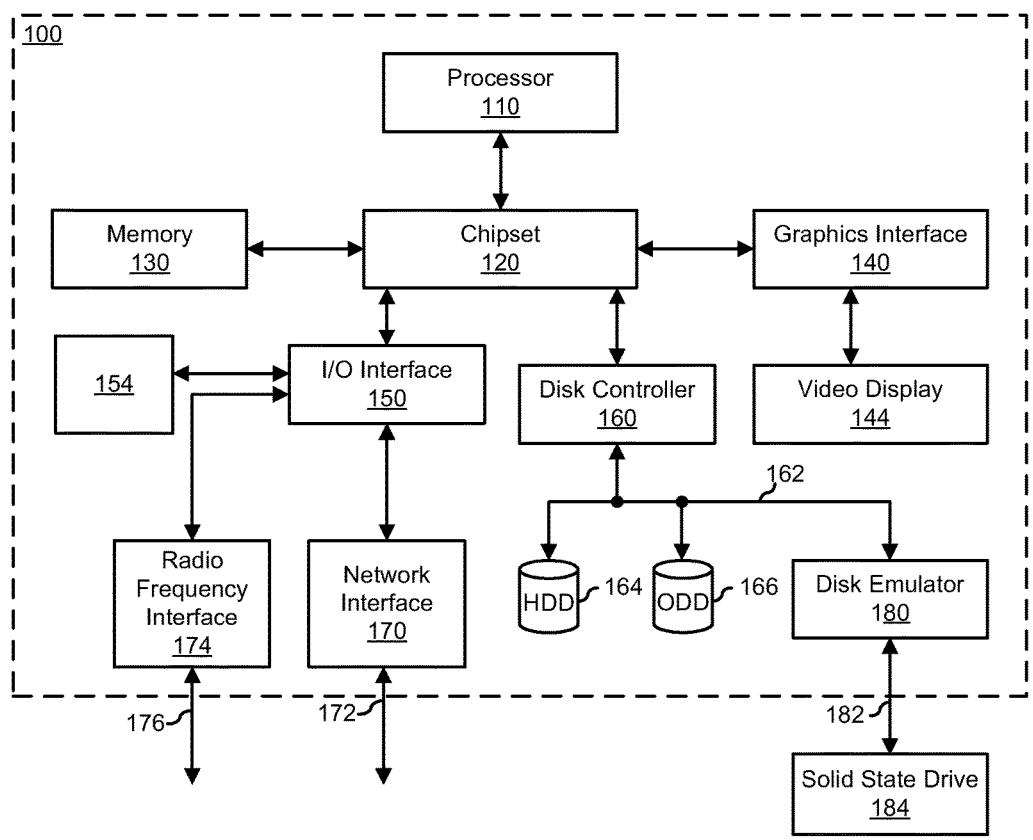
FIG. 1 illustrates a block diagram of an information handling system according to one aspect of the disclosure.

FIG. 1 illustrates a functional block diagram of an embodiment of an information handling system, generally designated as 100. Information handling system 100 includes processor 110, a chipset 120, a memory 130, a graphics interface 140, an input/output (I/O) interface 150, a disk controller 160, a network interface 170, and a disk emulator 180.

Processor 110 is coupled to chipset 120. Chipset 120 supports processor 110, allowing processor 110 to process machine-executable code. In a particular embodiment, information handling system 100 includes one or more additional processors, and chipset 120 supports the multiple processors, allowing for simultaneous processing by each of the processors, permitting the exchange of information between the processors and the other elements of information handling system 100. Processor 110 can be coupled to chipset 120 via a unique channel, or via a bus that shares information between processor 110, chipset 120, and other elements of information handling system 100.

Memory 130 is coupled to chipset 120. Memory 130 can be coupled to chipset 120 via a unique channel, or via a bus that shares information between chipset 120, memory 130, and other elements of information handling system 100. In particular, a bus can share information between processor 110, chipset 120 and memory 130. In a particular embodiment, processor 110 is coupled to memory 130 through a unique channel. In accordance with another aspect, an information handling system can include a separate memory dedicated to each of the processors. A non-limiting example of memory 130 includes static, dynamic, or non-volatile random access memory (SRAM, DRAM, or NVRAM), read only memory (ROM), flash memory, another type of memory, or any combination thereof.

Graphics interface 140 is coupled to chipset 120. Graphics interface 140 can be coupled to chipset 120 via a unique channel, or via a bus that shares information between chipset 120, graphics interface 140, and other elements of information handling system 100. Graphics interface 140 is coupled to a video display 144. Other graphics interfaces can also be used in addition to graphics interface 140 if needed or desired. Video display 144 can include one or more types of video displays, such as a flat panel display or other type of display device.

I/O interface 150 is coupled to chipset 120. I/O interface 150 can be coupled to chipset 120 via a unique channel, or via a bus that shares information between chipset 120, I/O interface 150, and other elements of information handling system 100. Other I/O interfaces can also be used in addition to I/O interface 150 if needed or desired. I/O interface 150 is coupled to one or more add-on resources 154. Add-on resource 154 can also include another data storage system, a graphics interface, a network interface card (NIC), a sound/video processing card, another suitable add-on resource or any combination thereof.

Network interface device 170 is coupled to I/O interface 150. Network interface 170 can be coupled to I/O interface 150 via a unique channel, or via a bus that shares information between I/O interface 150, network interface 170, and other elements of information handling system 100. Other network interfaces can also be used in addition to network interface 170 if needed or desired. Network interface 170 can be a NIC disposed within information handling system 100, on a main circuit board (such as a baseboard, a motherboard, or any combination thereof), integrated onto another component such as chipset 120, in another suitable location, or any combination thereof. Network interface 170 includes a network channel 172 that provide interfaces between information handling system 100 and other devices that are external to information handling system 100. Network interface 170 can also include additional network channels.

In an embodiment, radio frequency interface device 174 is coupled to I/O interface 150. Radio frequency interface device 174 can be coupled to I/O interface 150 via a unique channel, or via a bus that shares information between I/O interface 150, radio frequency interface device 174, and other elements of information handling system 100. Radio frequency interface device 174 can provide for radio frequency communication, such as via Bluetooth, Wi-Fi Direct, or other similar communications protocol, between information handling system 100 and other devices that are external to information handling system 100.

Disk controller 160 is coupled to chipset 110. Disk controller 160 can be coupled to chipset 120 via a unique channel, or via a bus that shares information between chipset 120, disk controller 160, and other elements of information handling system 100. Other disk controllers can also be used in addition to disk controller 160 if needed or desired. Disk controller 160 can include a disk interface 162. Disk controller 160 can be coupled to one or more disk drives via disk interface 162. Such disk drives include a hard disk drive (HDD) 164 or an optical disk drive (ODD) 166 (such as a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 160 can be coupled to disk emulator 180. Disk emulator 180 can permit a solid-state drive 184 to be coupled to information handling system 100 via an external interface. The external interface can include industry standard busses (such as USB or IEEE 1384 (Firewire)) or proprietary busses, or any combination thereof. Alternatively, solid-state drive 184 can be disposed within information handling system 100.

In a particular embodiment, HDD 144, ODD 166, solid state drive 184, or a combination thereof include a computer-readable medium in which one or more sets of machine-executable instructions such as software can be embedded. For example, the instructions can embody one or more of the methods or logic as described herein. In a particular embodiment, the instructions reside completely, or at least partially, within memory 130, and/or within processor 110 during execution by information handling system 100. Memory 130 and processor 110 can also include computer-readable media.

Figure 2:
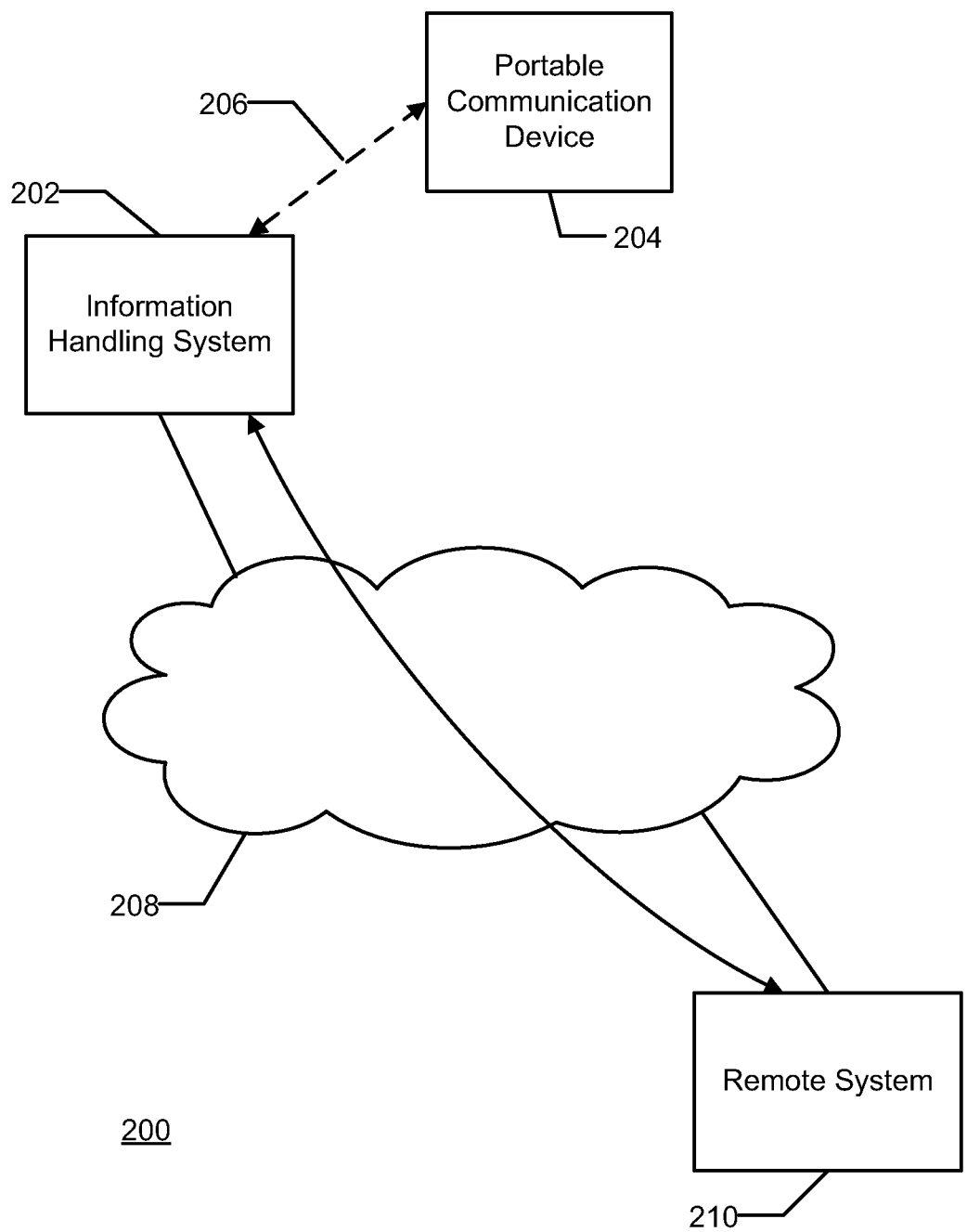
FIG. 2 is a block diagram illustrating a system for routing communications.

FIG. 2 illustrates an exemplary system 200 for providing audio or audio and video communications. System 200 can include an information handling system 202 and a portable communication device 204 coupled to the information handling system 202. For example, the information handling system 202 can be a laptop or desktop computer system or other computer usage platform similar to the information handling system 100. The portable communication device 204 can be a cellular telephone, a smart phone, or the like. Specifically, the portable communication device 204 can have a built-in display, a microphone, and a speaker. Additionally, the portable communication device 204 can be capable of communicating with the information handling system 202 over a radio frequency interface 206, such as Bluetooth, Wi-Fi direct, or other wireless communication. Further, the information handling system 202 can be connected to a network 208 for communicating with a remote system 210.

In an embodiment, the information handling system 202 can execute a softphone. The softphone can be a software program for making telephone calls over the Internet. The softphone can communicate with the remote system 210 using one or more Internet telephony protocols, such as Skype, Google Talk, Inter-Asterisk Exchange (IAX) protocol, or session initiation protocol (SIP). The softphone can process the signaling information needed to set up a media channel for communicating audio, and optionally video, with the remote system 210. Additionally, the softphone may encode and decode the audio in a format compatible for Internet telephony.

Further, the information handling system 202 can establish a bi-directional audio connection with the portable communication device 204. The bi-directional audio connection can enable audio from the telephone call to be sent to and received from the portable communication device 204. However, the signaling and media channel setup information may not be passed from the information handling system 202 to the portable communication device 204. The bi-direction audio communication can utilize a Headset Profile (HSP) or Hands-Free Profile (HFP) over a Bluetooth link. Alternatively, the bi-directional audio communication can utilize Wi-Fi Direct, Wireless USB, or other appropriate wireless communication.

In a particular embodiment, upon receiving an incoming call, the information handling system 202 may signal the portable communication device 204 to generate a ring and may provide caller identification information for display by the portable communication device. Additionally, the portable communication device 204 can provide a phone number and signal the information handling system 202 to initiate a call to that number.

Figure 3:
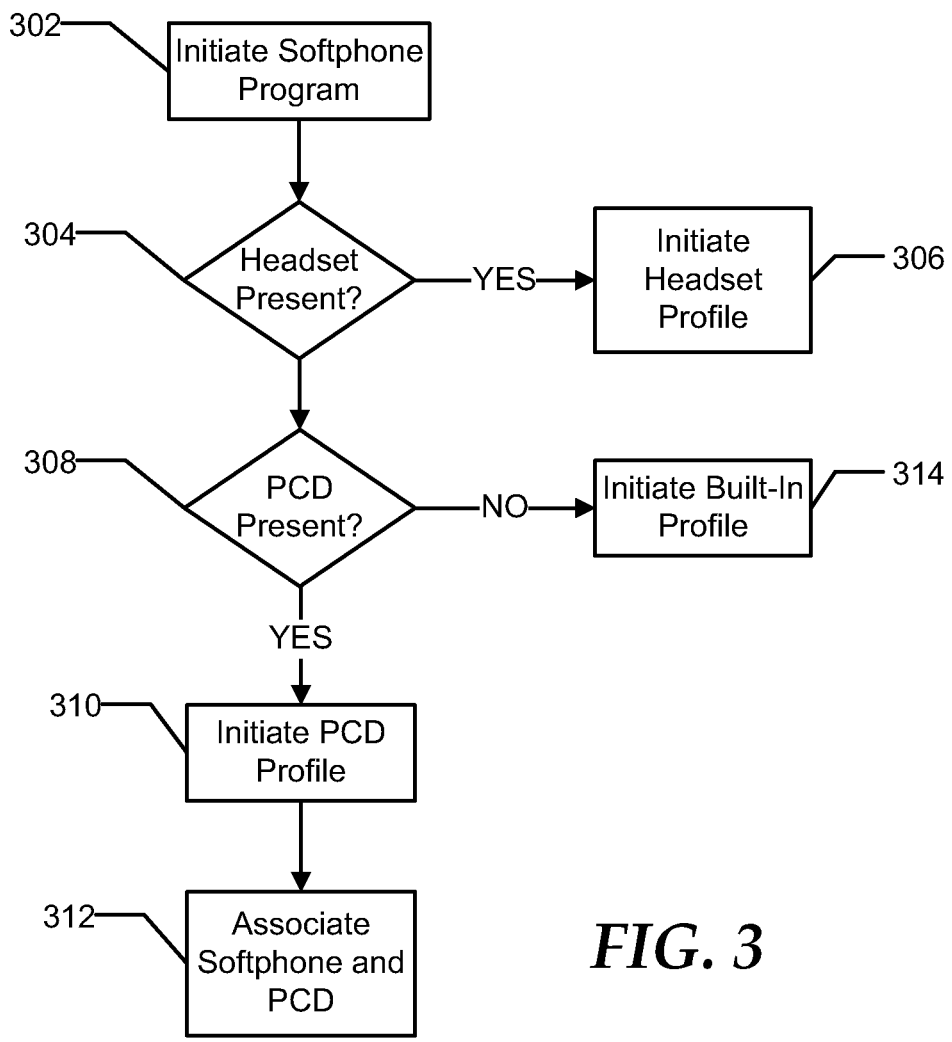
FIG. 3 is a flow diagram illustrating an exemplary method for selecting a calling interface.

FIG. 3 illustrates an exemplary method of selecting a device for providing audio communications to a user. At 302, a softphone program can be initiated on an information handling system, such as information handling system 202. The softphone program can include programming for making telephone calls over the Internet, such as by using a Voice over Internet Protocol (VoIP) communications protocol. At 304, the softphone can detect if a headset is present. The headset can include a wireless headset, such as a Bluetooth headset, or a wired headset, such as a USB headset. The headset can include a microphone and a speaker such that a user can participate in a telephone call or other type of bi-directional audio communication. While the headset can be capable of participating in a telephone call when connected to the information handling system, the headset may be incapable of making a telephone call independent from the information handling system. When the softphone detects a headset, the softphone can initiate a headset profile so that audio communications associated with a telephone call is routed through the headset, as illustrated at 306.

Alternatively, when the softphone fails to detect a headset, the softphone can determine if a portable communication device is present, as illustrated at 308. The portable communication device can be a cell phone, a smart phone, or other device capable of making a telephone call independent from the information handling system. When the softphone detects that a portable communication device is present, the softphone can initiate a portable communication device profile so that audio communications associated with a telephone call of the information handling system are routed through the portable communication device, as illustrated at 310. Additionally, the softphone and the portable communication device can associate to enable the audio communication to be routed through the portable communication device, as illustrated at 312.

Returning to 308, when the softphone fails to detect a portable communication device, the softphone can initiate a built-in profile, as illustrated at 314, to route audio communications associated with the telephone call can be routed through a speaker and microphone of the information handling system.

Figure 4:
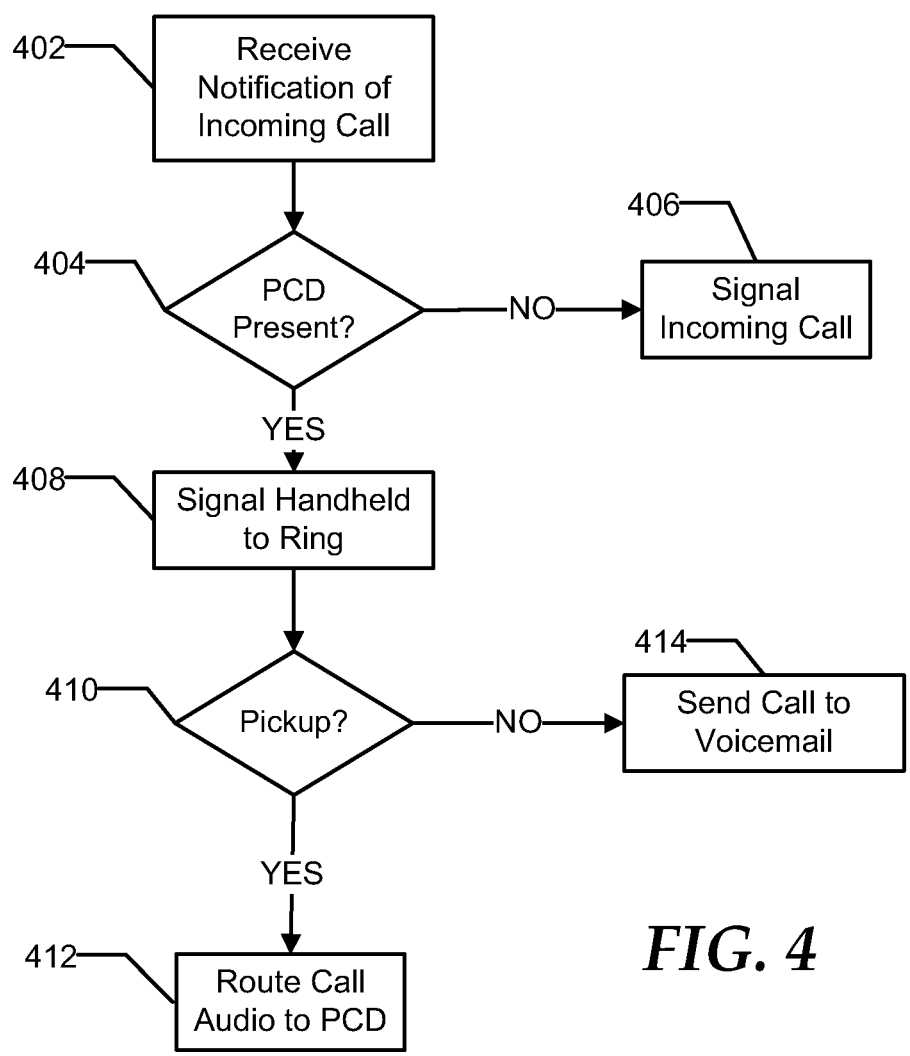
FIG. 4 is a flow diagram illustrating an exemplary method of establishing an incoming call.

FIG. 4 illustrates an exemplary method of receiving a telephone call by an information handling system, such as information handling system 202. At 402, the information handling system can receive a notification of an incoming call. For example, the information handling system may receive an invite message including information about the incoming call, such as an identifier for the calling party and path information for establishing an audio or audio/video connection with the calling party. At 404, the information handling system can determine if a portable communication device is present. When a portable communication device is not present, the information handling system can signal the presence of an incoming call, such as by generating an audible tone or displaying information on a display device, as illustrated at 406.

When a portable communication device is present, at 408, the information handling system can signal the portable communication device of an incoming call and the portable communication device can signal the presence of the incoming call such as by generating an audible tone or displaying information on a display of the portable communication device. For example, the portable communication device may generate a ring tone and display caller identification information on the display.

In an embodiment, the portable communication device can match caller identification information with phone numbers stored by the portable communication device to select a ring tone associated with the phone number. In another embodiment, the portable communication device can select a ring tone to indicate that the call is received through the information handling system.

At 410, the portable communication device can determine if the call is picked up by a user. When the call is picked up, the portable communication device can signal the information handling system and the call audio can be routed to the portable communication device, as illustrated at 412. Alternatively, when the call is not picked up, the call can be directed to a voicemail system, as illustrated at 414.

Figure 5:
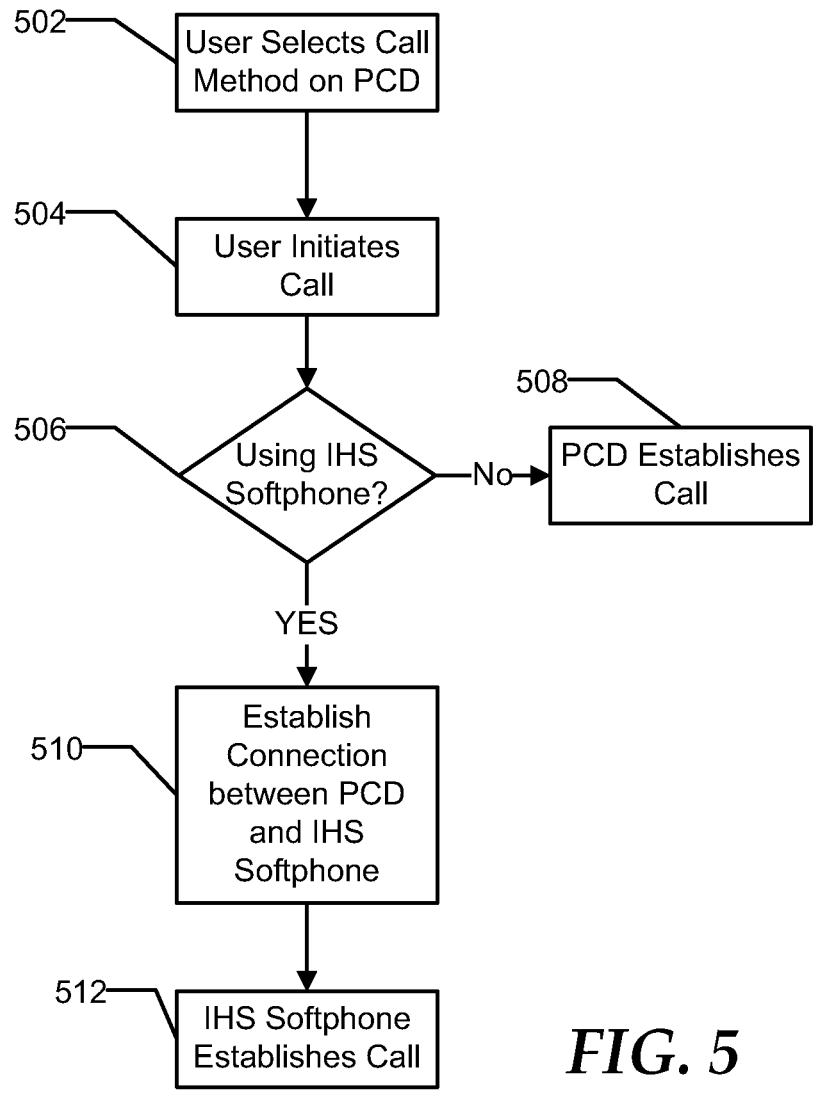
FIG. 5 is a flow diagram illustrating an exemplary method of initiating an outgoing call.

FIG. 5 illustrates an exemplary method of initiating a call from a portable communication device. At 502, a user can select a call method on the portable communication device. For example, the user can select from a call through a cellular network, an Internet telephony call using a softphone running on an information handling system, or a call Internet telephony call using a softphone running on the portable communication device. In addition to differences in how the call is handled and routed to the called party, the choice of call method can affect the caller identification information associated with the call. For example, a call through a cellular network can be identified as originating at the caller's cell number, a call using the information handling system can be identified as originating at a business number, and a call using a softphone on the portable communication device can be identified as originating from a personal number of the user.

At 504, the user can initiate the call. For example, the user can enter a phone number or select a contact from an address book or call history. In an embodiment, once the user selects to use a softphone of the information handling system, the personal communication device may access a contact list or call history of the softphone to enable the user to select phone numbers stored by the softphone in addition to phone numbers stored by the personal communication device.

At 506, the personal communication device can decide if the call should be established using the information handling system. When the call should not be established using the information handling system, the personal communication device can establish the call, as illustrated at 508. Alternatively, the personal communication device can establish a connection with the softphone on the information handling system, as illustrated at 510. Additionally, the personal communication device can provide the phone number to the softphone. At 512, the softphone can establish the call with the called party and route the audio to the personal communication device through a bi-directional audio connection.

When referred to as a "device," the embodiments described above can be configured as hardware, or a combination of hardware and software. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could further include software, including firmware embedded at a device, such as x86 class and/or ARM, MIPs or other controller based system, or software capable of operating a relevant environment of the information handling system. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In a particular embodiment, an information handling system can be used to function as one or more of the network systems, or carry out one or more of the methods described above. In another embodiment, one or more of the systems described above can be implemented in the form of an information handling system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for voice over IP communication, comprising:
a smartphone including:
a first processor;
a first memory including a first set of instructions executable by the first processor to:
communicate via a cellular network to send and receive telephone calls; and
communicate with an information handling system other than via the cellular network;
provide a user interface for initiating and receiving voice over IP communication via the information handling system;
the information handling system including:
a second processor; a second memory including a second set of instructions executable by the second processor to:
establish a voice over IP connection with a remote caller, wherein
establishing the voice over IP connection with the remote caller includes instructions to receive an invite message and to establish a media channel based on media channel setup information included in the invite message;
establish a bi-directional audio connection with the smartphone;
decode a first audio portion of the voice over IP communication and send the decoded audio to the smartphone via the bi-directional audio connection; and
encode audio received from the smartphone via the bi-directional audio connection as a second audio portion of the voice over IP communication and send the encoded audio to the remote caller via the voice over IP connection.

2. The system of claim 1, wherein the bi-directional audio connection is via Bluetooth or Wi-Fi direct.

3. The system of claim 1, wherein the second set of instructions does not include instructions to communicate media channel setup information of the voice over IP connection to the smartphone.

4. The system of claim 1, wherein the second set of instructions includes instructions to send caller ID information to the smartphone.

5. The system of claim 1, wherein the first set of instructions includes instructions to send a telephone number to the information handling system; and the second set of instructions includes instructions to initiate a voice over IP call with a called party based identified by the telephone number.

6. The system of claim 4, wherein the first memory further includes a contact list; and the first set of instructions includes instructions to match the caller ID information with an entry of the contact list and determine a ring tone based on the match.

7. The system of claim 5, wherein the first memory further includes an address book, and the first set of instructions includes instructions to access the address book to determine the telephone number.

8. The system of claim 5, wherein the second memory further includes a second address book, and the first set of instructions includes instructions to access the second address book to determine the telephone number.

9. The system of claim 5, wherein the first memory further includes instructions to provide an interface to enable a user to choose between calling the called party via the cellular network and calling the called party via the information handling system.

10. A method for receiving a voice over IP communication at an information handling system and using a smartphone to provide audio input and output, comprising:
establishing communication between a smartphone and the information handling system other than via a cellular network, the smartphone configured to communicate via the cellular network to send and receive telephone calls other than the Voice over IP communication;
establishing a Voice over IP connection between the information handling system and the remote caller, wherein
establishing the voice over IP connection with the remote caller includes receiving an invite message and establishing by the information handling system a media channel based on media channel setup information included in the invite message, wherein the media channel setup information is not communicated to the smartphone;
establishing a bi-directional audio connection between the information handling system and the smartphone;
decoding a first audio portion of the voice over IP communication at the information handling system and sending the decoded audio to the smartphone via the bi-directional audio connection; and
encoding audio received by the information handling system from the smartphone via the bi-directional audio connection as a second audio portion of the voice over IP communication and sending the encoded audio to the remote caller via the voice over IP connection.

11. The method of claim 10, further including providing a user interface at the smartphone for initiating and receiving voice over IP communication via the information handling system.

12. The method of claim 1, wherein the bi-directional audio connection is via Bluetooth or Wi-Fi direct.

13. The method of claim 10, further comprising sending caller ID information to the smartphone by the information handling system, and matching, by the smartphone, the caller ID information with an entry of the contact list stored by the smartphone and determine, by the smartphone, a ring tone based on the match.

14. A method for initiating a voice over IP communication between an information handling system and a remote called party, comprising:
- establishing communication between a smartphone and the information handling system other than via a cellular network, the smartphone configured to communicate via the cellular network to send and receive telephone calls other than the voice over IP communication;
- providing a telephone number of the called party by the smartphone to the information handling system;
- establishing a voice over IP connection between the information handling system and the called party, wherein
  - establishing the voice over IP connection with the remote caller includes receiving an invite message and establishing by the information handling system a media channel based on media channel setup information included in the invite message, wherein the media channel setup information is not communicated to the smartphone;
- establishing a bi-directional audio connection between the information handling system and the smartphone;
- decoding a first audio portion of the voice over IP communication at the information handling system and sending the decoded audio to the smartphone via the bi-directional audio connection; and
- encoding audio received by the information handling system from the smartphone via the bi-directional audio connection as a second audio portion of the voice over IP communication and sending the encoded audio to the remote caller via the voice over IP connection.

15. The method of claim 14, further including provide a user interface at the smartphone for initiating and receiving voice over IP communication via the information handling system.

16. The method of claim 14, wherein the bi-directional audio connection is via Bluetooth or Wi-Fi direct.

17. The method of claim 14, further comprising provide an interface to enable a user to choose between calling the called party via the cellular network and calling the called party via the information handling system.

18. The method of claim 14, further including providing a user interface at the smartphone for initiating and receiving voice over IP communication via the information handling system.

* * * * *